June 3, 1941.  W. D. WATERMAN  2,243,928
INFINITELY VARIABLE TORQUE CONVERTER
Filed Nov. 1, 1938  6 Sheets-Sheet 1

INVENTOR.
WALDO D. WATERMAN.
BY
ATTORNEY.

June 3, 1941.  W. D. WATERMAN  2,243,928
INFINITELY VARIABLE TORQUE CONVERTER
Filed Nov. 1, 1938  6 Sheets-Sheet 3

INVENTOR.
WALDO D. WATERMAN.
BY
ATTORNEY.

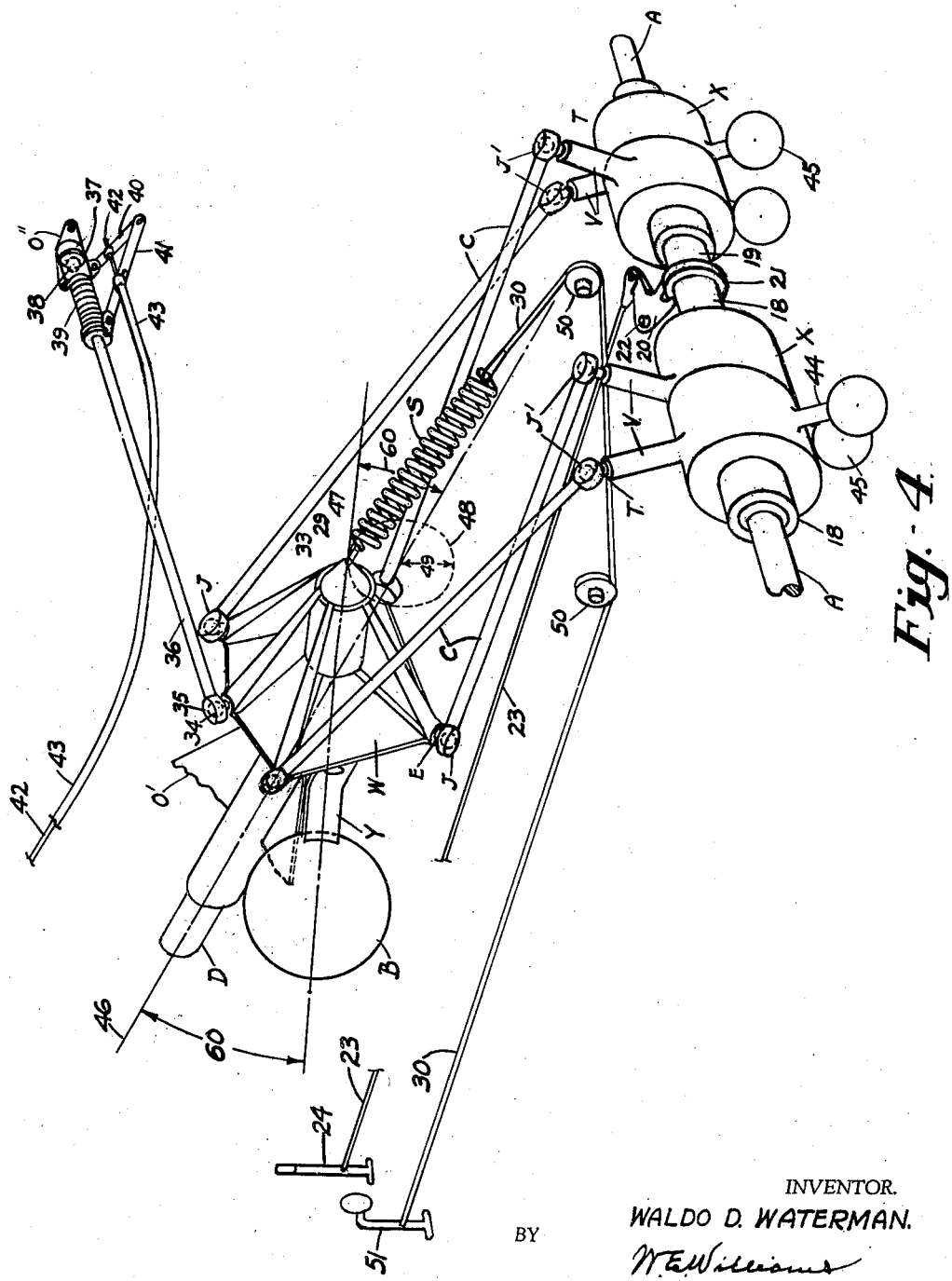

INVENTOR.
WALDO D. WATERMAN.
ATTORNEY.

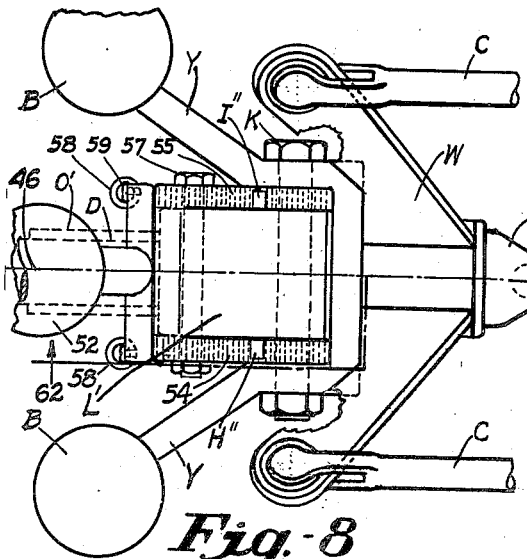
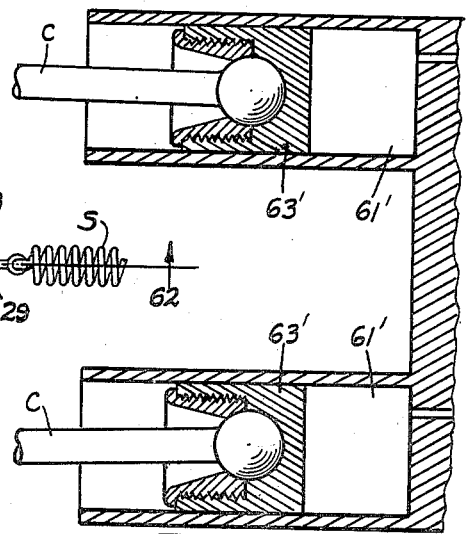
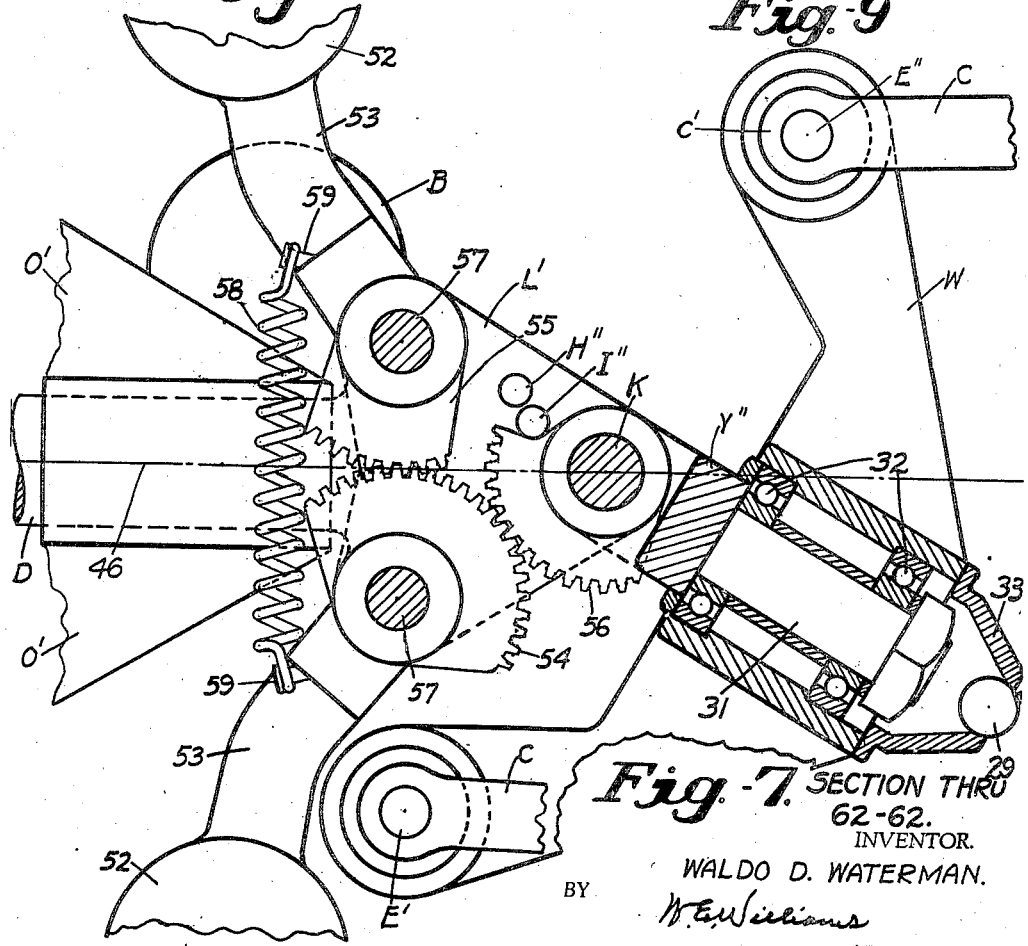

Patented June 3, 1941

2,243,928

UNITED STATES PATENT OFFICE 2,243,928

INFINITELY VARIABLE TORQUE CONVERTER

Waldo Dean Waterman, Santa Monica, Calif.

Application November 1, 1938, Serial No. 238,221

2 Claims. (Cl. 74—114)

My invention relates to an infinitely variable torque converter mechanism. This mechanism is adapted to convert torque from any source of power and convert it at any ratio of speed torque service power absorption within the normal limits of the original power applied to the mechanism. The ratios of the changing speed transformation of conversion may be adjusted manually or be controlled automatically by the mechanism itself as is explained in detail herein.

The main object of the invention is to make it possible to obtain whatever particular ratio of speed conversion desirable or efficient between a power supply input and a power absorption takeoff.

The use of the mechanism is not limited to any special service. It is particularly applicable to the automotive field in that it is adapted to replace the clutch, transmission, over-drive, bevel gearing and differential commonly used in motor car construction and the drawings and descriptions of this application relate directly to automotive service.

Some of the advantages to be gained by my invention as applied to automotive engineering, are that the optimum ratio of rotation between the source of power and the driven wheels for any given driving condition will materially increase the efficiency of the vehicle. This will result in the saving of fuel and the general wear and tear of the vehicle. Increased accelerations and the lack of necessity of operating the source of power at speeds in excess of its peak horsepower at high vehicle speed will increase the performance of the vehicle. The foregoing features will result in a vehicle of more economy and higher performance of a given horse-power and weight or will make it possible to build a vehicle of equal performance with a smaller and lower horse-power engine. Another advantage is that there will exist a continuous flow of power between the engine and the driven wheels even when the change of ratio is taking place, thereby eliminating the present necessity of discontinuing the flow of power while gear ratio changes are being made.

The elimination of the clutch, transmission, over-drive, beveled gearing, and differential, which have become standard in motor car practice, and the substitution thereof of my invention will reduce production costs and weight, as my device is less expensive to build and lighter than the parts which it will normally eliminate.

The operation of a motor vehicle with my invention installed therein will be greatly simplified. If it is arranged to operate automatically, the driver has but one control to operate, unless it is desired to reverse the vehicle. When the engine is started and permitted to idle the ratio equals infinity-to-one. As the speed of the engine is increased by depressing the engine throttle or acceleration pedal, infinity becomes a finite quantity; and therefore, torque is applied to the rear wheels. The device may be so built that the application of torque may start at any speed above the normal engine idling speed. The device is of such a nature that the greater the engine speed the less the ratio between the engine and the driven wheels; and the greater the torque load on the driven wheels, the greater the ratio between the engine and the wheels. We then have the two factors which determine horsepower, that is, torque and speed balanced against each other in such a manner that for a given power input a given ratio is obtained dependent upon the torque load on the driven wheels. The device must of necessity be designed so that its linkages, spring tensions, and balancing counterweights are most suited for the particular type of installation which is used, the principal governing factors being the horse-power and speed of the power supply and the torque and speed ranges desired of the driven wheels. It may be readily seen that the operation of a motor vehicle incorporating such a device, would only entail the proper foot pressure on the throttle control or accelerator pedal to obtain any desired performance of the vehicle from a standstill to its maximum speed, whether or not the vehicle was being operated on a level, downhill, or an up grade, the maximum angle of which was the limit of the climbing capabilities of the vehicle. The only thing necessary for the operator to do to discontinue torque application to the driven wheels is to close the engine throttle by releasing the foot pressure on the accelerator pedal. This reduces the engine speed to idling, under which condition the ratio immediately becomes infinity-to-one.

A small three position control lever is provided for forward, neutral and reverse conditions. It is not necessary to use the neutral position unless it is desired to accelerate the engine above normal idling speed while starting or warming it up preparatory to vehicle operation. To reverse the car, it is only necessary to move the lever to the reverse position and otherwise operate in the same manner as if forward motion were desired. The lever is placed in the forward position when it is desired to operate the car in the normal forward direction. The device as described will greatly simplify automobile operation in that no intelligence or effort on the part of the operator, other than exerting the proper pressure on the accelerator or throttle foot pedal, is required, as selecting the proper ratio between the engine and the driven wheels is automatic.

My invention also contemplates a manual control of the ratio between power supply input and power take-off, contemplating that there may be some applications in the use of my invention in which it is desired that the automatic factors are substituted for a control by the operator. There are several ways that this may be accomplished. It is not contemplated that the invention be limited to the control methods shown. It consists of a small electric motor so geared to the control ratio adjustment that a rotation of the electric motor in one direction will increase the ratio, and the rotation in the opposite direction will decrease the ratio. This motor is controlled by a switch having three positions: one for the direction of rotation causing a ratio increase, one for the direction of rotation causing a ratio decrease, and an "off" position for maintaining a constant ratio. The manipulation of the switch will therefore give or maintain any desired ratio within the limits of the mechanism.

Means are also provided for increasing or decreasing the tension of springs tending to offset the centrifugal force of the balance in the counterweights controllable by the operator. This added control may be used to increase or decrease the torque of the power output shafts above or below normal as the operator may desire.

A means is also provided which may or may not be used as is desired for a control of the power input supply to be regulated by the torque of the driven shafts and so arranged that any variation of torque which may be desired for the particular installation for which the mechanism is used.

Unlike many types of similar mechanisms this invention provides for a means of statically balancing of its moving parts, no matter what the degree or condition of motion may be. This should be considered one of the principal features of this invention in that the mechanism has been purposely so arranged that perfect balance may be acquired thru the entire range of the variable speed ratios. The balancing masses of the main oscillating member at the same time contributes to the centrifugal forces of rotation which operates in opposition to the torque forces. Complete static balancing of the roller ratchets on the driven axle and their connecting rods is also provided for. Whereas there will be energy absorbed in intermittently accelerating these masses, that energy is in turn restored to the driving shaft by the deceleration of the same masses. Although there is considerable amount of oscillating weight in the mechanism, it will be seen that there is no power loss for this oscillation other than the minor frictional losses.

Reference will be had to the accompanying drawings in which frame supporting members or casings are not shown for the purpose of clearness of illustrating the active mechanisms in which the invention resides, assuming that as to frame supporting members and casings, these are special to the particular installations that at any time may be made, and therefore such fixed member parts are almost entirely eliminated in the drawings.

Fig. 4 is a perspective view of the mechanism showing parts from the drive or engine shaft D back to and including the connections of the rear axle of the vehicle.

Figure 1:
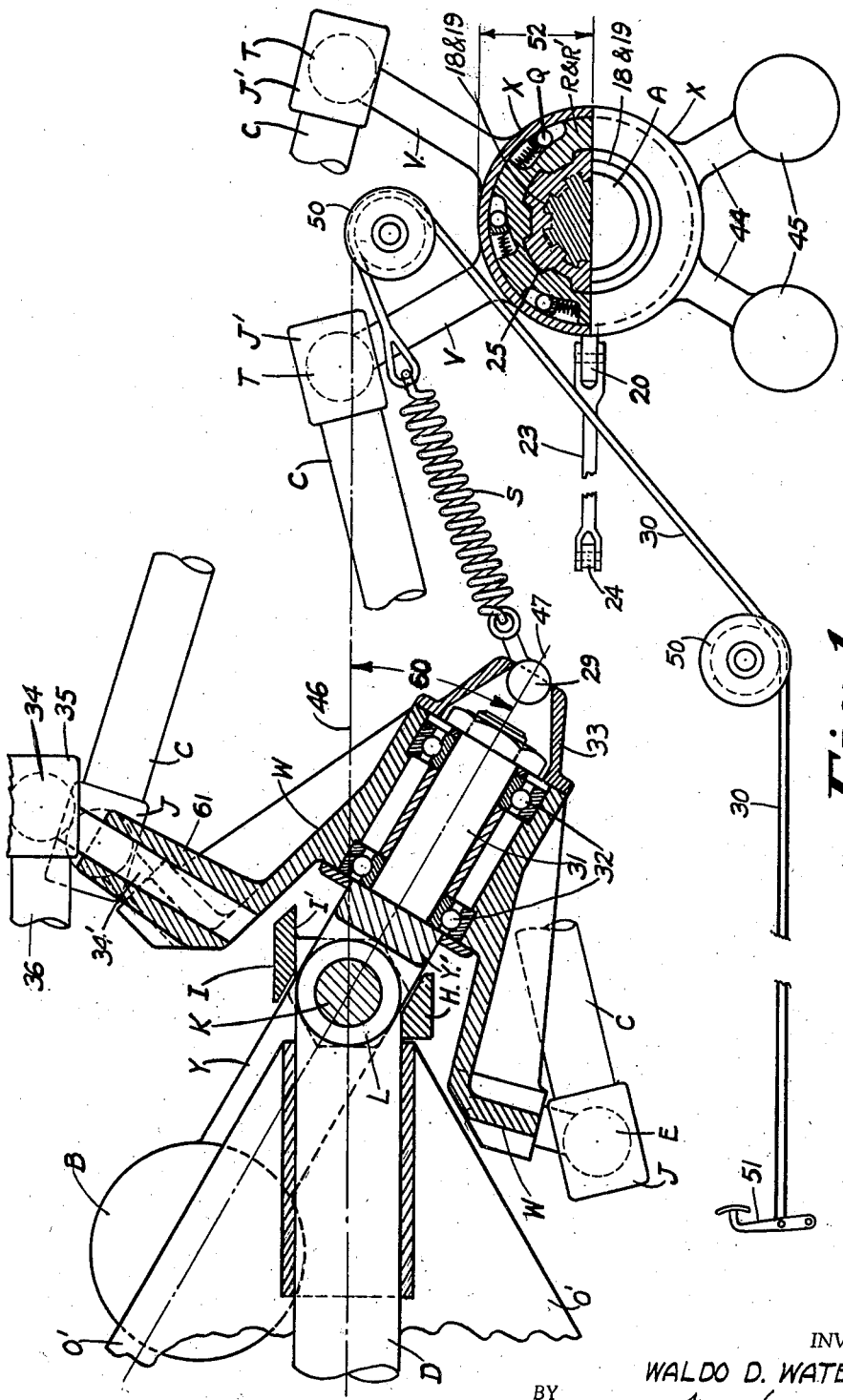
Fig. 1 is diagrammatical sectional elevational view, partly in section on line 52—52 of Fig. 2, longitudinally of the vehicle, extending from the engine drive shaft D to and across the rear axle A of the vehicle.

Fig. 7 is an elevation of a modified form of parts shown in Fig. 1 and in similar positions to those of Fig. 1. In this Fig. 7 the centrifugal forces introduced in yoke Y and its attachments may be added to or caused to function through different positions of Y in a different or variable magnitude by the addition of yoke arms 53 and counterweights 52 which are connected by gears 54, 55 and 56 or other suitable connections to yoke Y. As shown in Fig. 7 the portion L' has additional bearing holes for pins 57 which carry the attachments to the two counterweights 52. Fig. 7 is a section of line 62—62 of Fig. 8. Fig. 8 is a plan view but on a smaller scale than that shown in Fig. 7.

Figure 2:
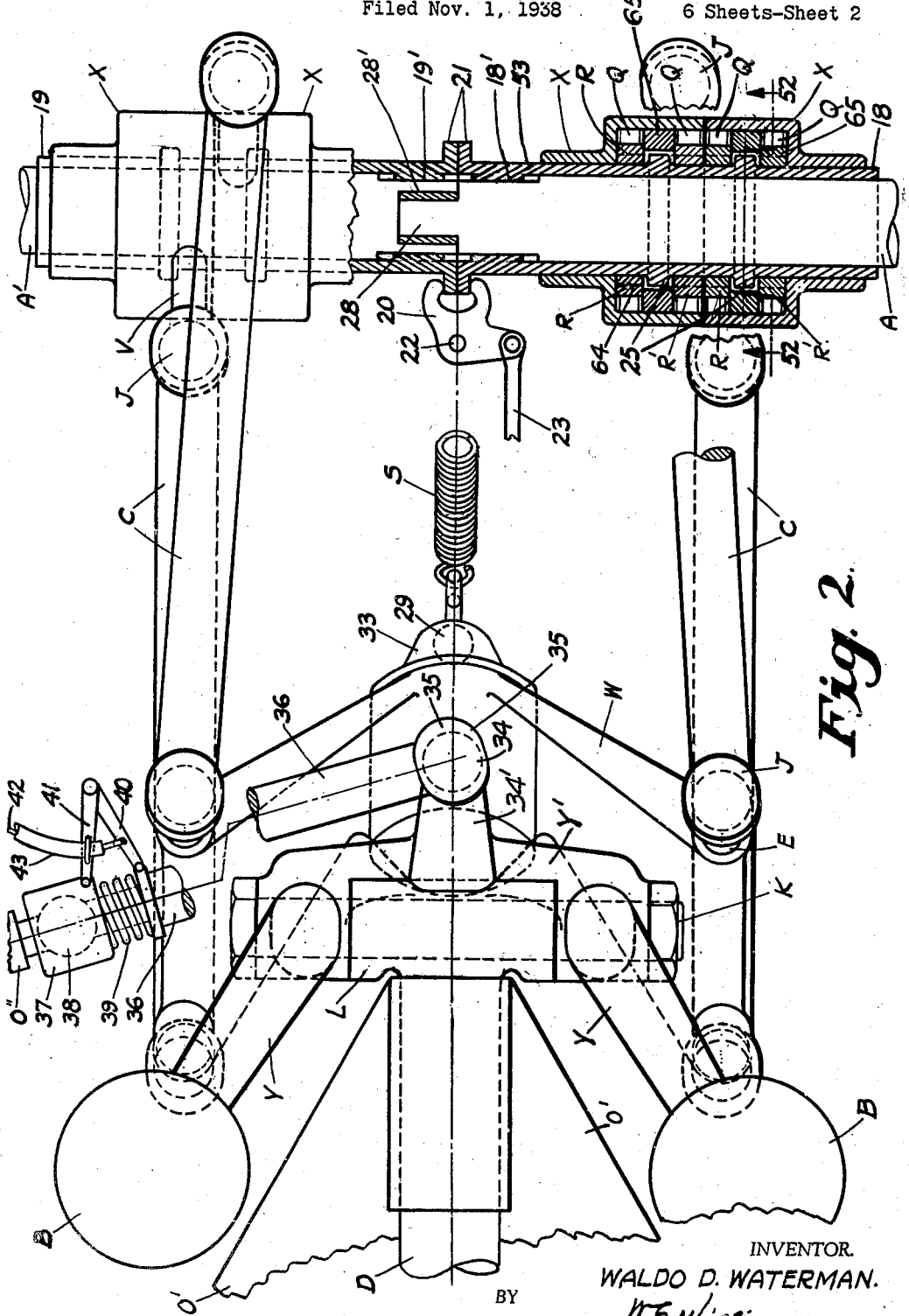
Fig. 2 is a plan partly in section of what is shown in Fig. 1.

Fig. 7 is a similar view to that of Fig. 1 but showing modified changes and Fig. 8 is similar to that of Fig. 2 showing the changes as indicated by Fig. 7.

Fig. 9 is a sectional view indicating pumps for pumping liquid for a pumping conversion of reciprocating elements to rotary movement in place of ratchet conversion shown herein.

In the drawings the source of power is indicated by the shaft D which may be driven by any power producing means, and in these drawings the shaft D is the engine shaft of the vehicle. The power absorbing element from the mechanism may be any suitable power receiving mechanism, and in the case of these drawings that mechanism is indicated as the rear or driving axle of an automotive vehicle indicated by A, except in Fig. 9 which shows a means of producing power hydraulically.

The torque converter mechanism involves the use of what is known as wabble member W so mounted and arranged that it can be oscillated at any ratio of speed or amplitude within the limits of the power generator or engine drive D as herein shown.

The power passing thru the wabble member W is taken from the margins of the member W by suitable connections to reciprocating connecting rods C connected to ratchet mechanisms on the axle members A whereby the reciprocating motions of the wabble plate W are transferred in rotating torque power which is absorbed by the axle A.

This mechanism as here shown is arranged for a vehicle drive and is so constructed and arranged that no power will be transmitted to driven member, being the axle A, until a given idling speed of the engine or drive shaft D goes above a set rotating speed, which set speed is adjustable and may be controlled by the driver or operator, and after the speed of the shaft D goes above the said speed. The rate of the rotation of the axles A is controlled by the combination of the engine or power input speed and the torque resisting rotation of axles A.

In the drawings Figs. 1 and 2 the shaft D indicates the power supply or engine drive mounted in any suitable bearing base member O'.

The drive shaft member D terminates in an enlarged transverse bearing portion L in which is mounted a transverse shaft or king pin K.

Upon the transverse shaft K there is fixed a yoke block Y having oppositely opposed arms extending towards and over the end of power shaft D and straddling over the frame member O' and terminating in a primary set of counter balancing balls B. The said arms and balls B are arranged to act as a single unit by the connecting portion Y' of the yoke block. To this portion Y' there is fixed a short yoke shaft 31 having its axis in alignment intersecting the axis of said shaft K and the axis of the drive shaft D. On the yoke shaft 31 there is mounted by ball bearings 32 the wobbler plate member W.

Thus the unit W is supported and carried by the shaft D through the medium of the yoke shaft 31 of the yoke Y.

In Fig. 1 the yoke Y and the mechanisms carried thereby, are shown at the maximum angle 60 about the shaft K from the center line 46 of the shaft D, and center line 47 of yoke Y. Any excess of angle 60 is prevented by stops H and I suitably fixed to the portion L of shaft D.

When the engine or power D is idle or running at an idling speed not driving the vehicle, the angle 60 is zero.

Under some conditions it may be desired in practice to cause the zero angle position of 60 which is described to be slightly above zero. If this be the case there is provided a small projection I' under the stop I which prevents the angle 60 from becoming exactly zero.

Figure 6:
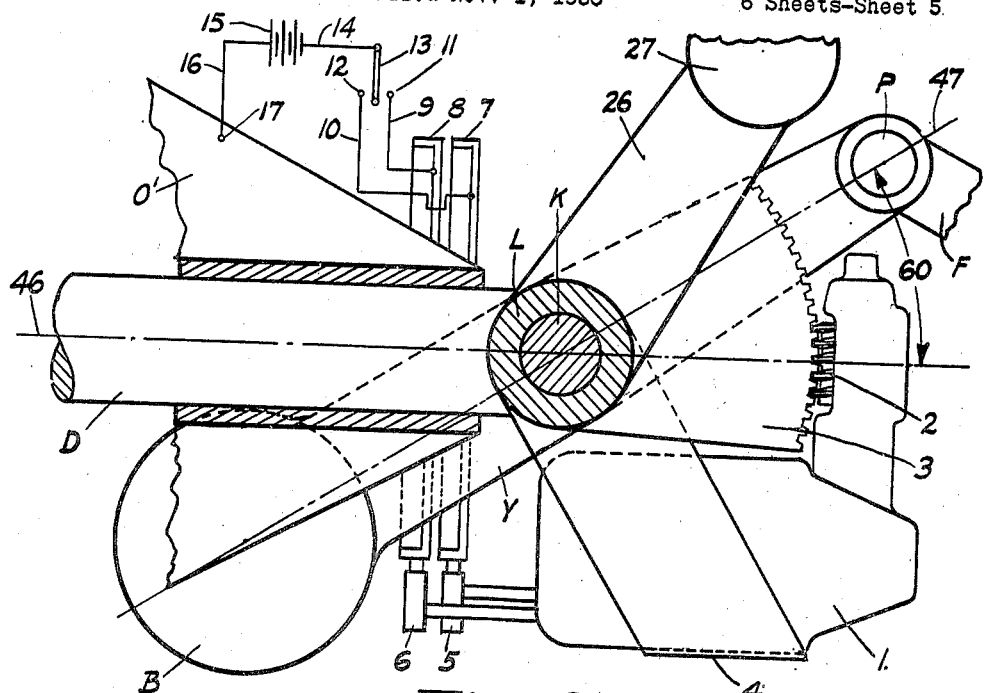
Fig. 6 is a diagrammatical elevation showing the speed change mechanism when the same is controlled by the operator thru electrical means.

The zero position of the parts as relates to the angle 60 is held in place by any suitable means and is here shown as relates to Figs. 1 to 5 inclusive and Figs. 7 and 8, controlled by spring tension, and in Fig. 6 by positive mechanism controlled by electrically operated mechanism controlled by the driver or operator.

Means are provided whereby the operator may manually control the tension of the said spring means, altho some installations may find it desirable to permanently fix said spring tension.

The spring controlling mechanism is provided with a spring S which, in the forms of all the figures, excepting 3 and 6, is connected to wabbler W by any suitable means and is here shown as a ball 29 articulating in a socket 33 fixed on the end of the wabble member W. The other end of the spring S is connected to a flexible member 30 trained over sheaves 50 and extending to the region of the driver or operator and controlled by a pedal 51 or other suitable means.

Figure 3:
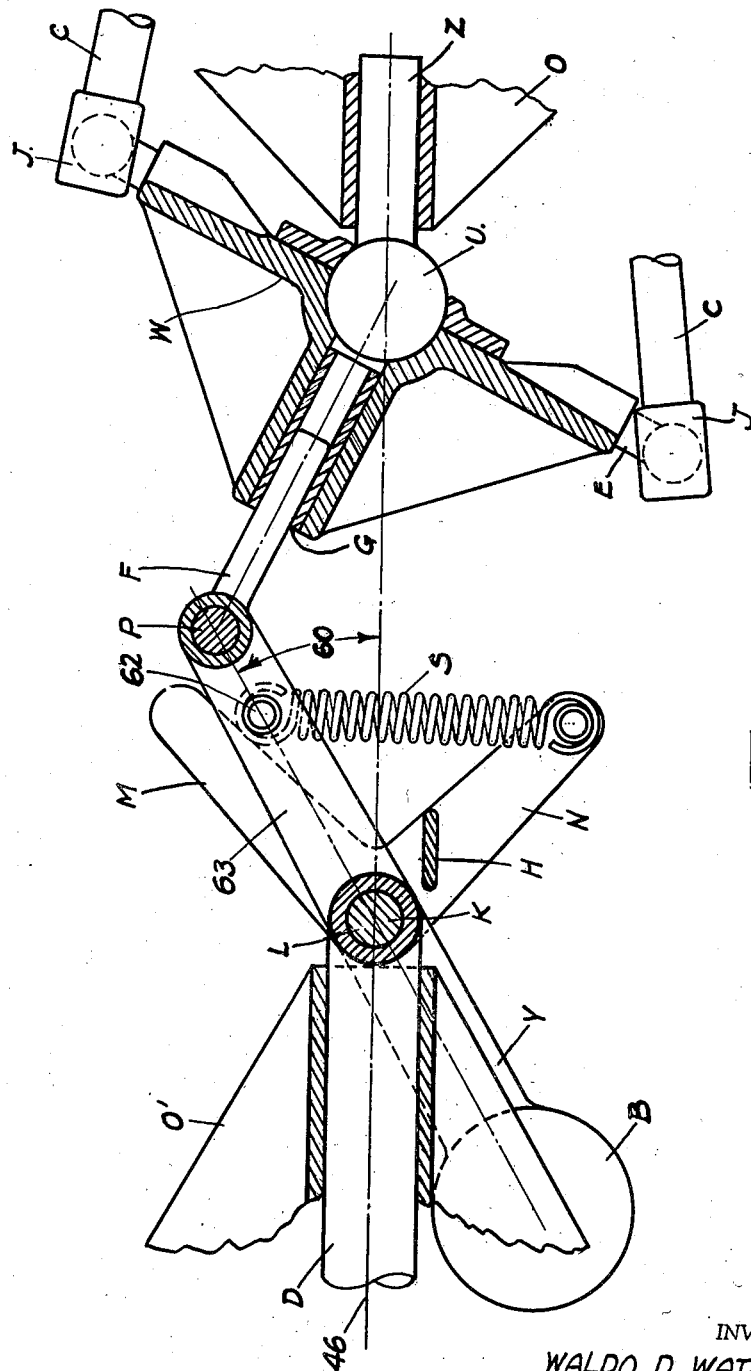
Fig. 3 is a sectional elevation on substantially the same section as that of Fig. 1, but showing a modified form of mechanism.

In the modified form of Fig. 3 the spring S is not shown as controlled directly by the operator, but the spring controlling means of the other figures may be adapted to this Fig. 3 construction.

The electrical control for the mechanisms that move in the angle 60, see Fig. 6, is composed of an electric motor I wired so that it may be run in either direction. A worm gear 2 is geared to be driven by the motor I and engages a rack gear 3 rigidly attached to yoke Y whereby the motor may move the yoke Y through the angle 60, as desired by the operator, by means of suitably controlling switches.

The motor I is controlled by the electrical contact brush 5 producing rotation of the motor in one direction but the contact brush 6 producing rotation of the motor in the opposite direction.

The brush 5 is in electrical contact with commutator ring 7 and brush 6 is in electrical contact with commutator ring 8.

Rings 7 and 8 are mounted rigidly to the fixed frame member O' and electrically insulated from each other and their attachments.

Wire 10 connects commutator ring 7 to pole 12. Wire 9 connects commutator ring 8 to pole 11. A switch 13 may swing to contact either pole 11 or 12 or neither as desired.

The switch 13 is connected by wire 14 to power supply source 15 the other side of which is grounded at 17 in the base frame member O' completing the circuit through the base of the electric motor I.

By movement of switch 13 the motor may be made to move as desired to change the angle 60 as before described and to hold the parts involved to the desired form required.

The motor I and its associate electrical connections may be mounted in operative position in any suitable manner and is here shown mounted as follows.

The motor I is attached to bracket 4 to bearing portion L of shaft D.

An arm 26 provided with a counterweight 27 is fixed to projection L for balancing the weight of the electric motor and its attachments as the same is revolved about the center line of power supply shaft D.

The other mechanism shown in Fig. 6, not above described, are described in rotation to the modified form shown by Fig. 3.

The wabble member W carried on the shaft 31 as described does not revolve as a body and is prevented from revolving bodily by hinged mechanisms connected to the member W and extending to fixed connection to the frame body.

The member W, see Fig. 1, is provided with a projection 61 into which is hinged a stem 34' having a ball connection 34 to a socket 35 of the torque arm 36.

The other end of this arm 36 is connected to the frame structure indicated by O', see Figs. 2 and 4, thru the medium of ball or universal joint 38 on the end of arm 36 held in hinged relation to O' by means of a socket 37.

This connection is made for the purpose of furnishing an auxiliary control to the power source which will be varied with the torque load on W if desired. A spring 39 is interposed between a shoulder on arm 36 and socket 37. The movement of this spring connection controls lever position 40 hinged to arm 36 and lever position 41 hinged to socket 37, 40 and 41 being hinged together. Attached to 40 is rod 42, and attached to 41 is casing 43, thru which rod 42 passes, which may in turn be suitably attached to any suitable means of power input control. It may be seen that any variation of torque in wabble plate W will cause a variation in the end load of 36 which in turn will vary the length of spring 39 causing the angle between 40 and 41 to change, which in turn will cause rod 42 to slide within casing 43, thereby supplying a means of control to the power input supply which will be varied as the torque load on wabble plate W varies.

Figure 5:
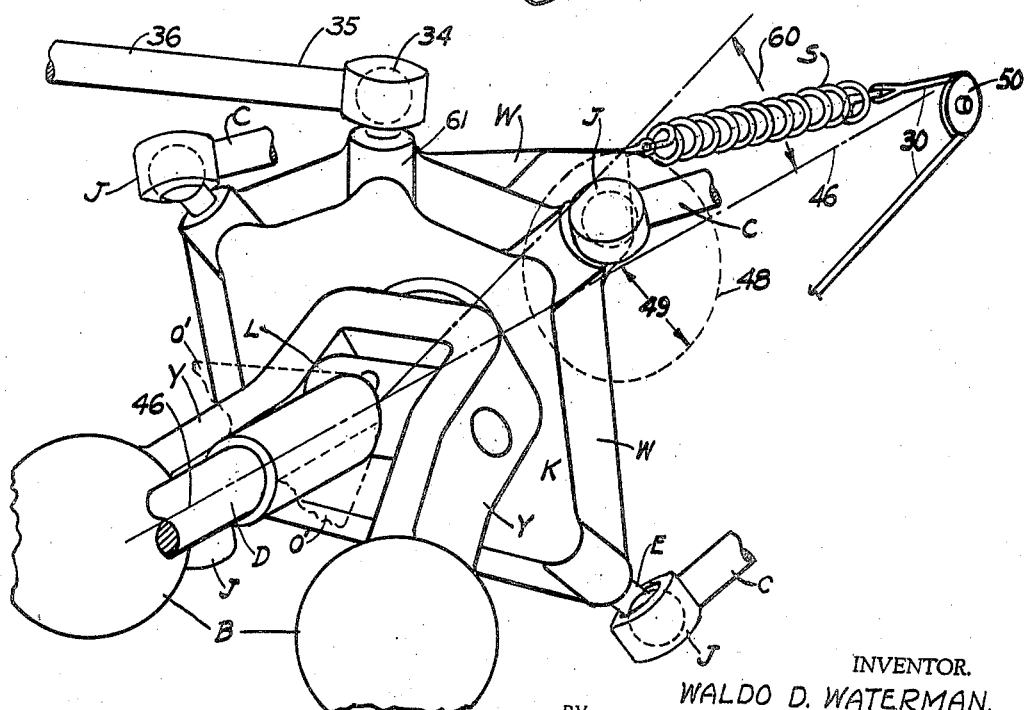
Fig. 5 is a perspective view looking from the engine drive shaft D back over mechanism shown in Fig. 4.

The wabble plate W is provided with four equidistantly arranged ball joint members E, or other suitable connections, see Fig. 5, connected in any suitable manner to sockets J on the ends of the connecting rods C extending back to driving ratchet mechanisms on the rear axle A.

In the modified form as shown by Fig. 3, the shaft D and its projection L and shaft K are substantially like the structure of Fig. 1. However there is fixed to the projection L rigid arms M and N and to the arm N there is fixed one end of a spring S. The other end of the spring S is fixed to a stop 62 fixed into yoke Y. In Fig. 3 the yoke Y has a single central projection 63 into which the stop 62 is fastened and this stop 62 abuts against the arm M and limits the angle of movement about the shaft K in this direction and a stop H on arm N limits the rotation of yoke Y in that direction being, as it were, the neutral or zero position of yoke Y in this form.

On the end of the projection 63 of yoke Y there is a joint P connected to a fulcrum pin F mounted to slide and rotate in an aperture of a modified form of wabble plate W.

This wabble plate is on a ball or universal joint U on a shaft Z held in the frame member O. The joints J and connecting rods C in the form of Fig. 3 are substantially like that of the other figures.

The modified construction as shown by Figs. 7 and 8 varies from the other figures in that the previously described figures show mechanisms which depend entirely upon the mass of yoke Y and its attachments to produce the centrifugal forces of rotation which in turn causes the increase in angularity of angle 60 from its lowest to its highest degree.

In Figs. 7 and 8 additional masses of weights are provided to produce additional centrifugal forces by rotation into the yoke Y and its attachment by gearing or other suitable means. Additional secondary counterweights 52 are attached to a part of yoke arms 53 which are fixed to and hinged to the yoke block Y by means of the pin shafts 57 which in turn are carried by the lug portion L' which also carries the king pin transverse shaft K.

In Figs. 1 to 6 the bearing L takes the place of the lug portion L' of Figs. 7 and 8. This lug portion L' has a transverse bearing in which is mounted the transverse shaft K. Additional bearings in portion L' are provided for cross shafts 57 as shown by Fig. 7 and Fig. 8. Arms 53 to which are attached secondary counterweights 52 and these arms are fixed to cross shafts 57. Inter-meshing gears 54 and 55 are fixed upon cross shafts 57 arranged to rotate the said shafts in unison. Gears 56 are fixed on shaft K and the gears 56 inter-mesh with the gears 54 whereby shafts 57 and the shaft K, all three of which move in unison through the medium of said gears.

The yoke Y of Figs. 1, 7 and 8 are fixed on the transverse shaft K and thus the said yoke with its yoke shaft 31, as it rocks in angular motion about the shaft K results in moving angularly the primary counterweight balls and also the secondary counterweight balls in relation to the axis line 46 of the drive shaft D.

It may be seen that as counterweights 52 move away from center line 46 the angle formed by shaft 31 and 46 will increase. At the same time the center of counterweights B swings away from line 46. Stops H and I are shown in the form of pins rigidly imbedded in lug portion L' at such a position that gears 55 and 56 will come in contact with them at such a position where limit stops may be desired.

Pins or lugs 59 are attached to yoke arms 53 for the purpose of anchoring spring or springs 58. These springs are used to restrain any centrifugal force of counterweights 52 at speeds of rotation of D below that which it is desired to cause an oscillation of wobble plate W. They also may serve to eliminate back lash between gears 54 and 55. Figs. 7 and 8 also show an additional suitable means of attaching connecting rods C to wobble plate W by the use of self-aligning ball bearings in place of ball and socket joints shown in Figs. 1 to 5.

For a better understanding of the parts last above described relating to what is shown by Figs. 7 and 8, being a modified form, the following explanation is made.

The movements of secondary counterweights 52 about their supporting shafts 57 are synchronized with the movements of the counterweights B on shaft K since shafts 57 are parallel to shaft K. This synchronizing movement of both sets of weights is brought about by the gear connections 54, 55 and 56, which cause both sets to always move jointly from any cause in the functioning of the apparatus. The primary counterweights B are fixedly supported by the shaft K and are mounted to straddle as it were the frame support O' and also the axis of the yoke shaft 31 and they are mounted in a plane passing through a plane of the axis of the said shaft 31 and those balls are asunder from each other and do not move in relation to each other.

The secondary weights 52 are also mounted to straddle the frame member O' and the center line 46 of the drive shaft D and they also straddle as it were the axis of the yoke shaft 31. The secondary counterweights 52 are located in between the primary counterweights B at an angle of 180 degrees, this arrangement provides an equal spacing in degrees of four counterweight balls as relates to the yoke block Y. The secondary weights 52 move to and from each other and to and from the center line 46 of the frame member O'. The primary weights B do not move to and from each other in any movement but move only as a single unit angularly to and from or in relation as it were to an angle with the center line 46.

Gears 54, 55 and 56 are fastened to their respective shafts 57 and K and are duplicated in the yoke block L'.

Springs 58 are mounted on each side of the arms 53 of weights 52 and serve to draw those weights toward each other. Gears 54 and 55 intermesh with each other and are fixed on their respective shafts 57 and thus coordinate the movements of the balls 52 with each other. Gears 54 engage gears 56 which latter are fixed to the transverse shaft K on which are fixed the arms which carry the primary balls B.

The spring S mounted as hereinbefore described at the outer end of the yoke shaft 31 normally acts to draw the said shaft 31 to parallel positions with the drive shaft D. In Figs. 7 and 8 the springs 58 act to coordinate with the afore mentioned spring S in an operation of the apparatus to hold the yoke shaft 31 and its supported wobbler W into neutral or idling position as relates to the driving function or service of power delivery.

The double sets of counterweights as herein provided result in a more efficient operation than when only the primary or single set of counterweights are used.

This case is distinguished somewhat from other similar devices since all the counterweights move to and from their positions in a single general direction transversely about the king pin shaft K and the axis of the yoke shaft 31. This movement is obtained by the parallelisms of shafts 57 with the king pin shaft K, as hereinbefore described.

Fig. 9 shows a suggestion for an alternate system of the conversion of power put into shaft D to the pumping of a fluid, the pressure and rate of flow being proportional to the power produced thereby. The apparatus shown indicates the rods C work the pistons 63 into cylinders 61 connected to suitable ducts and valves and other suitable hydraulic receiving mechanism for converting flowing fluid under pressure into power.

The connecting rods extend from their connections from the wobble member W back to the region of the rear axle A and A' and are connected by sockets J' to ball connections T to arms V of balanced rotating shells X. The shells X are held by frame mechanism (not shown) to prevent longitudinal movement along the axle shaft. The axle shaft here shown is in two sections A and A'. The section A is provided with a pilot end 28, see Fig. 2, which enters into a bushing 28' in the end of the axle shaft A'.

The axle sections A and A' are mounted inside of sleeve sections 18 and 19 which are adapted to be slid endwise along the axle shafts. These sleeves are provided with flanges 21 which are engaged by a clasp 20 to hold the sleeves to move as a single unit under the control of the clasp which is hinged to a pin 22 in the frame structure (not shown). The clasp 20 is connected by a rod 23 which extends to a lever stand 24, see Fig. 4, in reach of the operator whereby he moves the sleeves 18 and 19 to neutral, forward or reverse positions of drive of the ratchets which effect the rotation of the shafts A and A'.

The position of the parts are shown in section of Figs. 1 and 2 in the neutral position where the ratchets are not engaged to move the axles A and A'. There are portions of projections 25 on the sleeve which are notched and are adapted to slide into notches 64, indicated by dotted lines in Fig. 2, of ratchet cams R and R'.

There are a double set of ratchet cams or blocks R, one set in each of the shells X and are composed of roller ratchet cams R and R' separated by a neutral block ring 65. This ring 65 is opposite the portion of 25 on the sleeve 18 as shown in the figure which is the neutral position wherein the ratchets move but do not drive the shafts regardless of whether the ratchets R and R' are moving under influence of the wobble member. Rollers Q wedge between R and X for one direction of rotation, and float loosely for the other direction of rotation. The ratchets revolve the axle only when the sleeves 18 and 19 are moved either from the neutral position as indicated in Fig. 2. The ratchet R engages and drives forward and the ratchet R' drives backward by the reverse position of the ratchet cams as is the common arrangement of roller ratchets.

The sleeves 18 and 19 are provided with splines 18' and 19', see Fig. 2, which engage corresponding splines of the shafts A and A'.

The oscillation or wobble action of the wobble member W at all times acts on the ratchets to move them but the revolutions of the axles A and A' are controlled by the position of the sliding 18 and 19 under the control of the operator by lever 24 as described.

The device or mechanism herein described operates as follows:

When the engine is at rest the spring mechanism that is connected to move the angularity of the yoke Y moves the said yoke to a relationship with the drive shaft D whereat the angle 60 is substantially zero.

The operator when he wishes to use the vehicle or the mechanism for converting torque in power transmission starts his power input shaft D and in the case of a motor vehicle, until the speed of that shaft goes above the ordinary idling speed of the engine, the spring control of the angularity of the yoke prevents the counterweight balls from enlarging the angle 60 and thus while the yoke and its connections will revolve, the wobble member will not oscillate because of the position of the shaft on the yoke substantially coinciding with the axle of the drive shaft. Thus no oscillation will take place of the wobble plate W.

However when the speed of the drive shaft D goes above a predetermined or the idling speed, the centrifugal forces on the counterweights B and 52 will increase the angle 60 from substantially zero, depending on the speed of the drive shaft, to any intermediate angle between zero and the stops I as before described, and thus the wobble plate will be made to oscillate in varying amplitudes depending on the speed of the drive shaft and the centrifugal force of the counterweights overcoming the tension of the spring control of the angle 60. When the ratchet members are in gear to drive the axle shaft the vehicle will then move under the power transmitted thru the wobble member.

When the travel resistance of the vehicle or resistance of any kind to the rotation of the axles A and A' exists, this resistance will tend to reduce the oscillation amplitude of the wobble plate, and this in turn will tend to lessen the angularity of the angle 60 which then automatically allows the drive shaft to have a greater purchase or leverage to overcome the moving resistance of the axles and thus automatically, as it were, bring about what amounts to a gear shift of the ordinary automobile drive mechanisms. However as the operator wishes to increase the power applied to the shaft D and keep up and overcome the increased resistance without slowing down the vehicle he then gives the engine or the unit of power D more energy by added gas or steam as the case may be to the engine.

The variations of the angle 60 in the mechanism arranged as described herein allows a change of speed of the driving axle from zero to any maximum, within the limits of the power of the shaft D, by continuous change of speed with no alteration or shifting of mechanisms step by step as is the case with the gear shifting torque changing devices.

However an operator may set the amount of the angle 60 for speed changes when he may wish to arrive at by means of the mechanism manually or electrically controlled as herein described.

What I claim is:

1. In a mechanism of the class described, a power input drive shaft, a transverse bearing fixed at the end thereof the axis of which intersects the central axis of said drive shaft, a transverse shaft mounted in said bearing, a yoke mounted on said transverse shaft and adapted to move angularly thereabout, said yoke provided with a shaft extension on one side thereof arranged at right angles to the said transverse shaft on which said yoke is mounted and adapted to carry and revolve within a wabbler member, and a wabbler member mounted thereon, said wabbler member adapted to wabble but restrained against revolutions by a suitable connection to the frame member of the mechanism, said yoke provided with counterweights thereon on the opposite side of said yoke from that of the said shaft carried by the said yoke, said wabble member having connected thereto reciprocating members suitably connected for transmitting motion to a power receiving mechanism.

2. In an apparatus of the class described, a power unit driving shaft, a transverse bearing mounted across the end of said shaft at right angles thereto the axis of which bearing intersects the axis of said driving shaft, a transverse shaft mounted in said transverse bearing, a yoke block fixed on said transverse shaft, a yoke shaft mounted on one end of said yoke block and aligned to intersect the axis of said transverse shaft and the axis of said drive shaft and adapted to support and revolve within a wobbler member, a wobbler member mounted on said yoke shaft, means for holding said wobbler member from rotating, counter balancing weight balls in two sets of two balls each connected to said yoke block on the side opposite the said yoke shaft, and astride and asunder the axis of said yoke shaft, the sets of balls mounted 180 degrees from each other and around the said axis of said yoke shaft and the balls of either set being in the same plane as the balls of that set, one set of said balls being the primary set carried by arms fixed to the said yoke block and held in fixed position asunder from each other straddling the axis of said yoke shaft, the other set of balls, being the secondary set, mounted asunder from each other and asunder from said yoke shaft axis and mounted on arms fixed to cross shafts in said yoke block, said cross shafts arranged in said yoke block in parallel relation to the said transverse shaft in said yoke block, the said cross shafts connected by gearing to the said transverse shafts whereby rotation of either shaft causes the transverse shaft and the cross shafts to move simultaneously, gearing connecting the two cross shafts together whereby the rotation of those shafts moves the secondary counter weights supported by those cross shafts to move to and from each other and directly to and from the axis of said yoke shaft, springs connected across to the arms of said secondary balls arranged to draw that set of balls toward each other, a spring connected at the outer end of the said yoke shaft acting to hold said yoke shaft in line toward the axis of said drive shaft; in combination with means connected with said wobbler member for converting wobbler motion to that of rotating motion.

WALDO DEAN WATERMAN.